United States Patent
Ohnaka

(10) Patent No.: US 8,532,111 B2
(45) Date of Patent: Sep. 10, 2013

(54) TRANSMISSION APPARATUS, TRANSMISSION METHOD, AND PROGRAM

(75) Inventor: Shinobu Ohnaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1101 days.

(21) Appl. No.: 12/391,532

(22) Filed: Feb. 24, 2009

(65) Prior Publication Data

US 2009/0252162 A1 Oct. 8, 2009

(30) Foreign Application Priority Data

Apr. 4, 2008 (JP) ................................. 2008-098267

(51) Int. Cl.
*H04L 12/28* (2006.01)
*H04L 12/56* (2006.01)
*H04L 12/54* (2006.01)

(52) U.S. Cl.
USPC .......................................... 370/394; 370/429

(58) Field of Classification Search
None
See application file for complete search history.

(56) References Cited

U.S. PATENT DOCUMENTS

| 7,212,538 B2 * | 5/2007 | Abrol et al. ................... 370/412 |
| 7,328,390 B2 * | 2/2008 | Fuhs et al. .................... 714/748 |
| 2007/0291782 A1 * | 12/2007 | Basso et al. ................... 370/428 |

FOREIGN PATENT DOCUMENTS

| JP | 2005-136547 | 5/2005 |
| JP | 2006-101339 | 4/2006 |
| JP | 2007-235976 | 9/2007 |

\* cited by examiner

*Primary Examiner* — Chirag Shah
*Assistant Examiner* — Ashley Shivers
(74) *Attorney, Agent, or Firm* — Oblon, Spivak, McClelland, Maier & Neustadt, L.L.P.

(57) ABSTRACT

Disclosed herein is a transmission apparatus including a receiving unit configured to receive ACK packets transmitted from a reception apparatus in response to transmission data items, an ACK storing unit configured to store a latest ACK packet which is last received among the ACK packets, and a TCP/IP processing unit configured to perform processing of receiving an ACK packet in accordance with the latest ACK packet supplied from the ACK storing means at a predetermined timing.

7 Claims, 7 Drawing Sheets

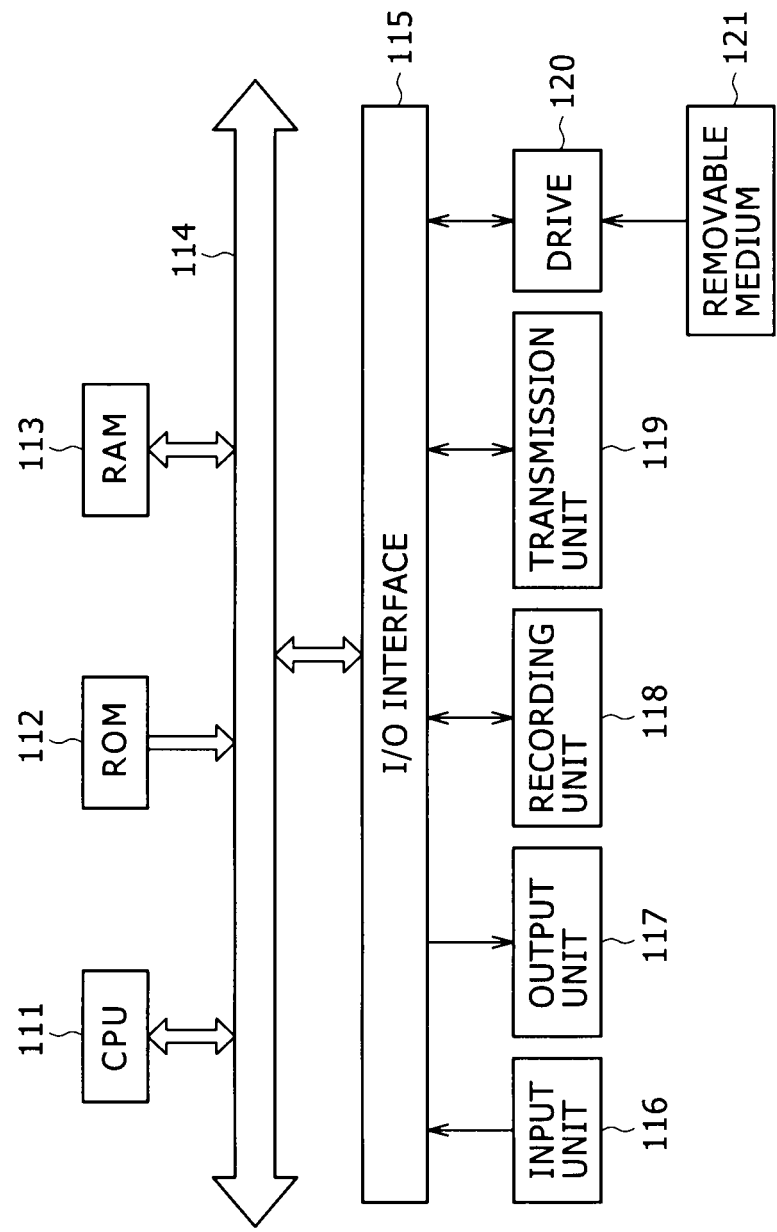

TRANSMISSION APPARATUS, TRANSMISSION METHOD, AND PROGRAM

BACKGROUND OF THE INVENTION

1. Field of the Invention

The present invention relates to transmission apparatuses, transmission methods, and recording media including programs, and particularly relates to a transmission apparatus which attains improved TCP/IP communication speed, a transmission method, and a program.

2. Description of the Related Art

In recent years, TCP/IP (Transmission Control Protocol/Internet Protocol) has been broadly used as a standard transmission protocol of networks such as the Internet.

In general, in a TCP/IP communication, a data transmitter receives an ACK (Acknowledgement) packet as an acknowledgement of data reception from a TCP/IP protocol stack of a data receiver. An acknowledgement number (ACK number) included in the ACK packet has a sequence number and data representing a size of received data. When the ACK packet is not transmitted to the data transmitter as a response, the data transmitter retransmits data which is the same as data which was transmitted but the ACK packet regarding the data has not been received by the data transmitter.

The applicant of the present embodiment has previously proposed a technique of retransmitting a packet (refer to Japanese Patent Laid-Open No. 2005-136547, for example).

In the proposed technique, when it is determined that a receiver can receive a retransmission packet by the time when data should be reproduced, an operation of retransmitting the requested retransmission packet is controlled.

SUMMARY OF THE INVENTION

However, with known techniques including the technique disclosed in Japanese Patent Laid-Open No. 2005-136547, in a case where a host serving as a transmitter does not have capacity to perform processing or in a case where a TCP/IP protocol stack serving as a data receiver is designed so as to transmit a considerable number of ACK packets, ACK packet reception processing performed by the host serving as the data transmitter may cause deterioration of TCP/IP communication speed.

The present embodiment has been made in view of the above problem, and the present embodiment attains reduction of operations to be performed in a TCP/IP communication and improves TCP/IP communication speed.

According to an embodiment of the present invention, there is provided a transmission apparatus including receiving means for receiving ACK packets transmitted from a reception apparatus in response to transmission data items, ACK storing means for storing a latest ACK packet which is last received among the ACK packets, and TCP/IP processing means for performing processing of receiving an ACK packet in accordance with the latest ACK packet supplied from the ACK storing means at a predetermined timing.

The ACK storing means may store a particular ACK packet, among the received ACK packets, as the latest ACK packet in a case where the particular ACK packet has been transmitted from a communication partner in a TCP/IP communication and in a case where a preceding packet has not been stored in the ACK storing means.

The ACK storing means stores a particular ACK packet, among the received ACK packets, as the latest ACK packet, under the condition that the particular ACK packet has been transmitted from the communication partner in the TCP/IP communication and is consecutive to another ACK packet which has been stored as the latest packet in the ACK storing means, when a period of time for which the another latest ACK packet is stored in the ACK storing means does not exceed a predetermined period of time and when the number of the stored ACK packets is smaller than the maximum number of ACK packets to be stored.

In a case where the ACK storing means receives an ACK packet that is not consecutive to the packet which has been stored as the latest ACK packet in the ACK storing means, the ACK storing means supplies the latest ACK packet to the TCP/IP processing means when a period of time for which the latest ACK packet is stored in the ACK storing means exceeds a predetermined period of time or when the number of the stored ACK packets reaches the maximum number of ACK packets to be stored.

The TCP/IP processing means may transmit to the ACK storing means an ACK processing request for obtaining the latest ACK packet at a predetermined timing. The ACK storing means may supply the stored latest ACK packet to the TCP/IP processing means in response to the ACK processing request.

According to another embodiment of the present invention, there is provided a transmission method including the steps of storing a latest ACK packet which is last received among ACK packets transmitted from a reception apparatus in response to transmission data items, and performing processing of receiving an ACK packet in accordance with the latest ACK packet supplied at a predetermined timing.

According to a further embodiment of the present invention, there is provided a program corresponding to the transmission method described above.

In the transmission apparatus, the transmission method, and the program, a latest ACK packet which is last received among ACK packets transmitted from a reception apparatus in response to transmission data items is stored, and processing of receiving an ACK packet is performed in accordance with the latest ACK packet at a predetermined timing.

Accordingly, a speed of a TCP/IP communication is improved.

BRIEF DESCRIPTION OF THE DRAWINGS

FIG. 7 is a block diagram illustrating an example of a configuration of a computer.

DETAILED DESCRIPTION OF THE PREFERRED EMBODIMENTS

Embodiments of the present invention will be described hereinafter with reference to accompanying drawings.

Figure 1:
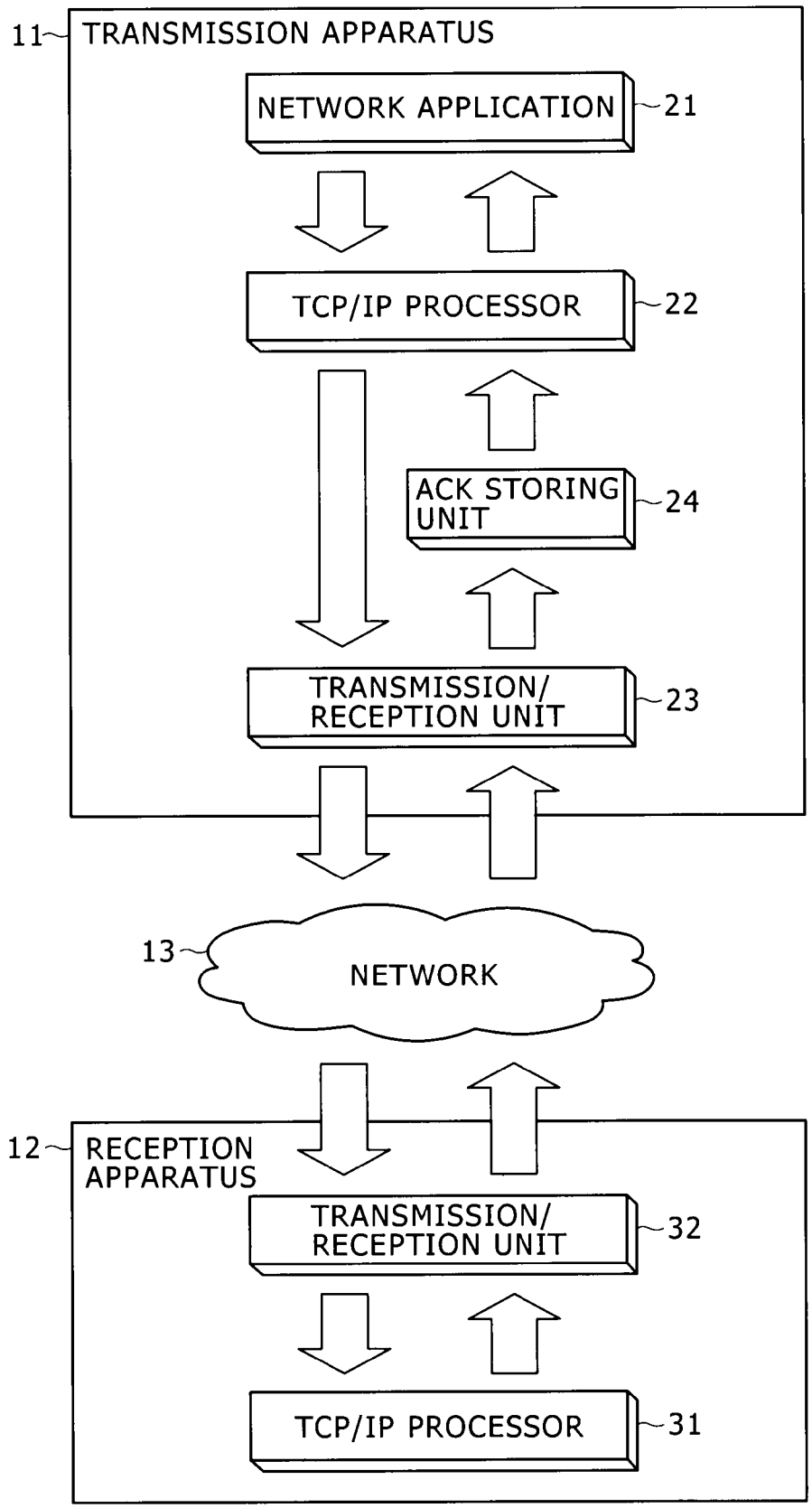
FIG. 1 is a block diagram illustrating a communication system according to a first embodiment of the present invention.

FIG. 1 is a block diagram illustrating a configuration of a communication system according to a first embodiment of the present invention. In the communication system, a transmission apparatus 11 and a reception apparatus 12 are connected to a network 13, and are communicated with each other.

Note that the network 13 corresponds to a transmission path, such as a wired or wireless communication line, a wired or wireless network, or the Internet, and transmits a packet from the transmission apparatus 11 to reception apparatus 12 with a predetermined delay time.

The transmission apparatus 11 transmits a packet including transmission data through the network 13 to the reception apparatus 12 in response to a request transmitted from the reception apparatus 12. Furthermore, the transmission apparatus 11 stores, for a predetermined period of time, an ACK packet which serves as an acknowledgement of reception of the transmission data and which is received in TCP/IP communication, and determines whether ACK reception processing is to be performed in a later stage. The transmission apparatus 11 performs the ACK reception processing in accordance with a result of the determination.

Specifically, as shown in FIG. 1, the transmission apparatus 11 includes a network application 21, a TCP/IP processor 22, a transmission/reception unit 23, and an ACK storing unit 24.

The network application 21 generates transmission data to be transmitted to a certain device, such as the reception apparatus 12, which is connected to the network 13, and supplies the transmission data to the TCP/IP processor 22.

The TCP/IP processor 22 performs protocol processing which is processing of dividing the transmission data into transmission data items supplied from the network application 21 and storing the divided transmission data items to respective packets. The TCP/IP processor 22 transmits the packets which stores the transmission data items to the transmission/reception unit 23.

The transmission/reception unit 23 transmits each of the packets supplied from the TCP/IP processor 22 to the reception apparatus 12 through the network 13. Hereinafter, description will be made hereinafter taking one of the transmission data items and a corresponding one of the packets to be transmitted as examples for simplicity.

The transmission/reception unit 23 receives an ACK packet which serves as an acknowledgement of a reception of the transmission data item and which is transmitted from the reception apparatus 12, and supplies the ACK packet to the ACK storing unit 24.

The ACK storing unit 24 determines whether to store the ACK packet supplied from the transmission/reception unit 23 for a predetermined period of time or supply the ACK packet to the TCP/IP processor 22. When the ACK storing unit 24 determines to store the ACK packet for a predetermined period of time, the ACK packet is stored in the ACK storing unit 24. On the other hand, when the ACK storing unit 24 determines to supply the ACK packet to the TCP/IP processor 22, the ACK packet is supplied to the TCP/IP processor 22.

The determination is made in accordance with setting of three parameters, that is, a maximum stored-ACK-packet count representing the maximum number of stored ACK packets, an ACK storing timer (ACK storing time) which determines a period of time in which the ACK packet is stored, and an ACK storing function which enables or disables a function of storing an ACK packet. That is, it is determined whether the ACK packet is to be stored for a predetermined period of time or is to be supplied to the TCP/IP processor 22 by setting the three parameters, i.e., the number of stored ACK packets, the ACK storing timer, and the ACK storing function.

Specifically, in a case, for example, where the ACK storing unit 24 receives a ACK packet which is continuous from another ACK packet which has been stored in the ACK storing unit 24, the ACK storing unit 24 stores the received ACK packet as the latest ACK packet, counts the number of stored ACK packets, and sets the ACK storing timer. On the other hand, in a case where the ACK storing unit 24 receives a ACK packet which is not continuous from another ACK packet which has been stored in the ACK storing unit 24, in a case where a period of time in which the ACK storing timer counts after the latest ACK packet is stored exceeds a certain period of time, or in a case where the number of stored ACK packets has reached the maximum number of stored ACK packets, the latest ACK packet stored in the ACK storing unit 24 is supplied to the TCP/IP processor 22.

Note that the parameter representing the number of stored ACK packets and the parameter of the ACK storing timer are set by taking a frequency of transmissions of ACK packets from a device which receives transmission data items and intervals of the transmissions into consideration so that data transfer to the device is not interrupted. Alternatively, static values may be set to the parameter representing the number of stored ACK packets and the parameter of the ACK storing timer, and the values may be dynamically changed.

Only in a case where the parameter of the ACK storing function represents an available state of the ACK storing function, the ACK storing unit 24 performs the ACK storing processing.

When determining that the ACK packet is to be transmitted to the TCP/IP processor 22, the ACK storing unit 24 transmits the ACK packet to the TCP/IP processor 22, and the TCP/IP processor 22 performs the processing of receiving the ACK packet. Specifically, the TCP/IP processor 22 recognizes data items among the plurality of data items included in the transmission data which have been transmitted in accordance with information items stored in corresponding ACK packets supplied from the ACK storing unit 24, and discards the transmission data items which have been transmitted (normal TCP/IP transmission processing).

Furthermore, the TCP/IP processor 22 notifies the network application 21 of completion of the transmission after checking ACK packets of all the transmission data items. By this, the network application 21 recognizes the completion of the transmission of the transmission data.

The transmission apparatus 11 is configured as described above.

The reception apparatus 12 receives a packet transmitted through the network 13 from the transmission apparatus 11. The reception apparatus 12 extracts a transmission data item from the received packet and outputs the extracted transmission data item.

As shown in FIG. 1, the reception apparatus 12 includes a TCP/IP processor 31 and a transmission/reception unit 32.

The transmission/reception unit 32 receives the packet including the transmission data item which is transmitted through the network 13 from the transmission apparatus 11 and supplies the packet to the TCP/IP processor 31.

The TCP/IP processor 31 receives the packet supplied from the transmission/reception unit 32 and extracts the transmission data item from the packet. Furthermore, the TCP/IP processor 31 supplies an ACK packet serving as an acknowledgement of the reception of the transmission data item to the transmission/reception unit 32.

The transmission/reception unit 32 transmits the ACK packet supplied from the TCP/IP processor 31 to the transmission apparatus 11 through the network 13.

The reception apparatus 12 is configured as described above.

In the communication system configured as described above, the transmission apparatus 11 which transmits a packet including a transmission data item receives an ACK packet serving as an acknowledgement of a reception. Among a plurality of ACK packets received by the transmission apparatus 11, an ACK packet which is last received is stored, and the processing of receiving an ACK packet is performed using the stored ACK packet at a predetermined timing.

Referring now to a flowchart of FIG. 2, transmission processing performed by the transmission apparatus 11 will be described.

Note that, in FIG. 2, in a case where a packet including a transmission data item is transmitted, description of processing performed before a TCP connection is established is omitted for simplicity, and processing performed after the TCP connection is established between the transmission apparatus 11 and the reception apparatus 12 will be described.

In step S1, the network application 21 generates transmission data to be transmitted to the reception apparatus 12 and supplies the transmission data to the TCP/IP processor 22.

In step S2, the TCP/IP processor 22 performs protocol processing on the transmission data supplied from the network application 21. The TCP/IP processor 22 supplies each of a plurality of packets including transmission data items obtained by performing the protocol processing on the transmission data to the transmission/reception unit 23. Hereinafter, description will be made hereinafter taking one of the transmission data items and a corresponding one of the packets to be transmitted as examples for simplicity.

In step S3, the transmission/reception unit 23 transmits the packet supplied from the TCP/IP processor 22 to the reception apparatus 12 through the network 13.

Then, an ACK packet serving as an acknowledgement of a reception is transmitted from the reception apparatus 12 which received the transmission data item, and in step S4, the transmission/reception unit 23 receives the ACK packet transmitted from the reception apparatus 12 through the network 13 and supplies the ACK packet to the ACK storing unit 24. Note that, when receiving the packet transmitted through the network 13, the transmission/reception unit 23 supplies the packet to the ACK storing unit 24 irrespective of content of the packet. That is, the ACK storing unit 24 receives various packets, other than ACK packets, which are transmitted through the network 13.

In step S5, the ACK storing unit 24 performs ACK storing processing so as to determine whether to store the ACK packet, among the various packets transmitted from the transmission/reception unit 23, for a predetermined period of time or supply the ACK packet to the TCP/IP processor 22.

Referring now to a flowchart of FIG. 3, the ACK storing processing performed by the ACK storing unit 24 shown in FIG. 1 which corresponds to the operation of step S5 will be described in detail.

In step S11, the ACK storing unit 24 receives the packet supplied from the transmission/reception unit 23. In step S12, the ACK storing unit 24 determines whether an ACK storing function is available. When the determination is negative in step S12, the ACK storing unit 24 does not store the packet but supplies the packet to the TCP/IP processor 22 in step S19, and the process returns to step S11. That is, when the ACK storing function is not available, the ACK packet is not stored and is immediately supplied to the TCP/IP processor 22.

On the other hand, when the determination is affirmative in step S12, the ACK storing unit 24 determines whether the packet has been supplied from the communication partner in the TCP/IP communication in step S13.

When it is determined that the received ACK packet has not been supplied from the communication partner in the TCP/IP communication, i.e., the reception apparatus 12, in step S13, the ACK storing unit 24 does not store the received packet and supplies the packet to the TCP/IP processor 22 in step S19, and the process returns to step S11. On the other hand, when it is determined that the received ACK packet has been supplied from the communication partner in the TCP/IP communication, i.e., the reception apparatus 12, in step S13, the ACK storing unit 24 determines whether a preceding packet has been stored therein in step S14.

When it is determined that any preceding ACK packet is not stored in the ACK storing unit 24 in step S14, the ACK storing unit 24 determines whether a TCP control flag other than an ACK flag and a TCP option has been added in step S20.

When the determination is negative in step S20, the ACK storing unit 24 stores the received latest packet therein and sets an ACK storing timer in step S21. That is, in this case, the received latest ACK packet is stored in the ACK storing unit 24 and the ACK storing timer is set in the ACK storing unit 24. Thereafter, the process returns to step S11.

On the other hand, when the determination is affirmative in step S20, the ACK storing unit 24 does not store the received packet therein and supplies the packet to the TCP/IP processor 22 in step S19, and then, the process returns to step S11. Note that examples of the control flag other than the TCP option and the ACK flag include a PSH flag and a URG flag. Such a control flag is set in a case where a request for performing special processing is made. Therefore, the ACK packet is not stored in the ACK storing unit 24 and is immediately supplied to the TCP/IP processor 22.

When it is determined that a preceding ACK packet has been stored in the ACK storing unit 24 in step S14, the ACK storing unit 24 determines whether the received latest ACK packet is continuous from the preceding ACK packet stored in the ACK storing unit 24 in step S15.

When the determination is negative in step S15, the ACK storing unit 24 supplies the stored preceding ACK packet and the received latest ACK packet to the TCP/IP processor 22 in step S22, and then the process returns to step S11. That is, in this case, since packet loss occurs, both of the preceding ACK packet and the latest ACK packet are supplied to the TCP/IP processor 22.

When the determination is affirmative in step S15, the ACK storing unit 24 determines whether a TCP control flag other than a TCP option and an ACK flag has been added to the received ACK packet in step S16.

When the determination is affirmative in step S16, the process proceeds to step S22 where the ACK storing unit 24 supplies the preceding ACK packet stored therein and the latest ACK packet to the TCP/IP processor 22 in step S22, and then, the process returns to step S11. On the other hand, when the determination is negative in step S16, the ACK storing unit 24 determines whether the maximum number of stored ACK packets is reached in step S17.

When the determination is negative in step S17, the ACK storing unit 24 stores the received ACK packet therein as the latest ACK packet, resets the ACK storing timer, and counts ACK packets which have been stored therein in step S18. That is, in this case, since the number of stored ACK packets does not reach the maximum number of stored ACK packets, the received ACK packet is stored in the ACK storing unit 24. Furthermore, since the received ACK packet is stored as the latest ACK packet, the ACK storing unit 24 resets the ACK storing timer and increments the number of stored ACK packets.

On the other hand, when the determination is affirmative in step S17, the ACK storing unit 24 supplies the latest ACK packet to the TCP/IP processor 22 and resets the ACK storing timer in step S23. That is, in this case, since the number of stored ACK packets reaches the maximum number of stored ACK packets, the received latest ACK packet is supplied to the TCP/IP processor 22. Furthermore, since the latest ACK packet is supplied to the TCP/IP processor 22, the ACK storing timer is reset. After the operation of step S18 or step S23, the process returns to step S11.

After the operation of step S18, step S19, step S21, step S22, or step S3, the process returns to step S11, and the operations described above are repeatedly performed. That is, since the process from step S11 to step S23 is repeatedly performed, ACK packets serving as acknowledgements of receptions of transmission data items are stored in the ACK storing unit 24 or supplied to the TCP/IP processor 22.

Figure 3:
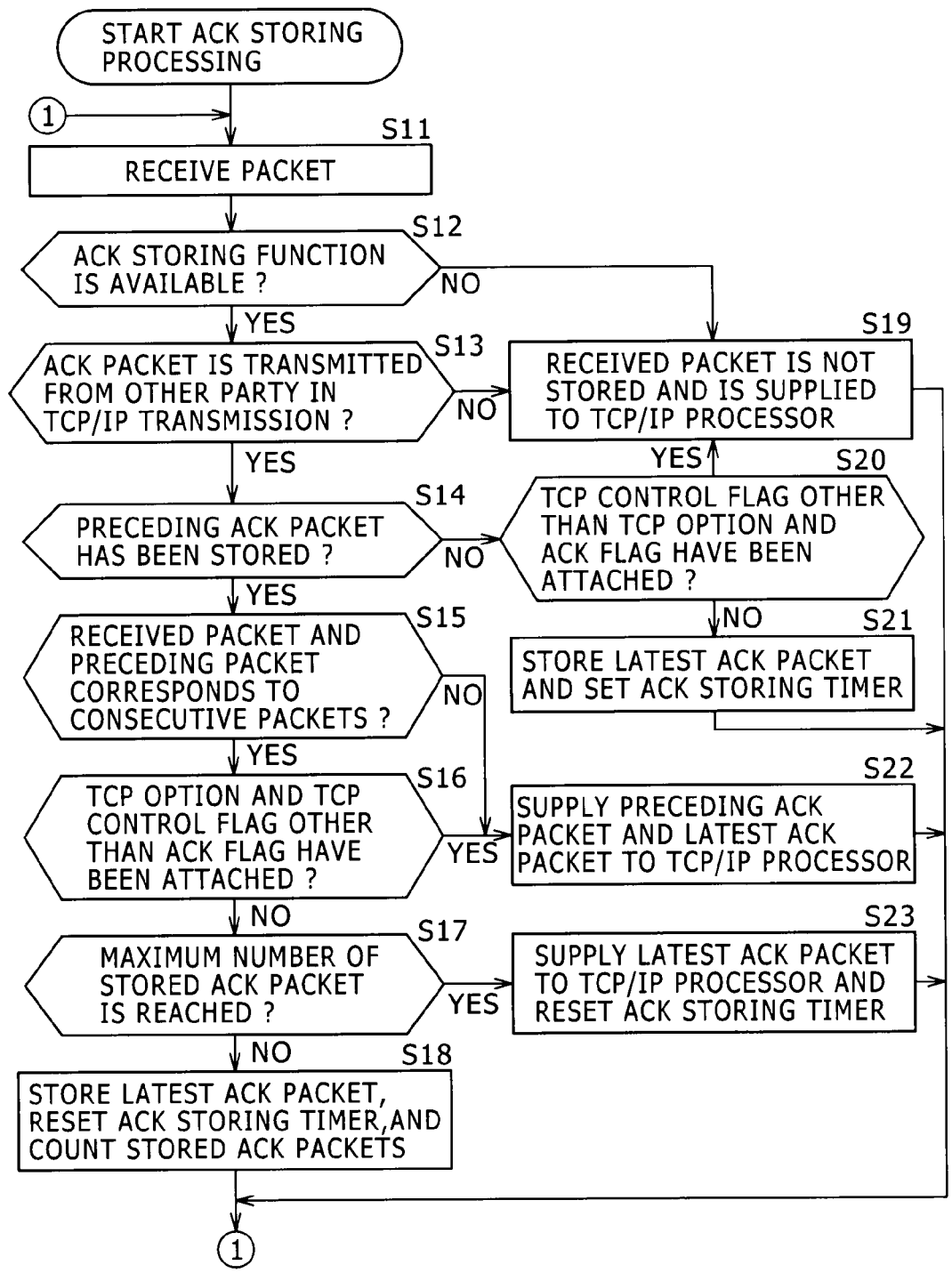
FIG. 3 is a flowchart illustrating ACK storing processing according to the first embodiment of the present invention.

Note that, although not shown in FIG. 3, in a case where a certain period of time in which connection of the ACK packets is waited for, which is set using the ACK storing timer, has passed after the latest ACK packet is stored in the ACK storing unit 24, the stored ACK packet is supplied to the TCP/IP processor 22.

As described above, in a case where, while storing a first ACK packet, the ACK storing unit 24 receives a second ACK packet which is continuous from the first ACK packet, the latest ACK packet is stored and ACK packets which have been stored are counted. On the other hand, in a case where a third ACK packet which is not continuous from the first ACK packet is received, in a case where a certain period of time has passed after the ACK storing timer started counting, or in a case where the number of stored packets reaches the maximum number of ACK packets, the latest ACK packet which has been stored in the ACK storing unit 24 is supplied to the TCP/IP processor 22.

Figure 2:
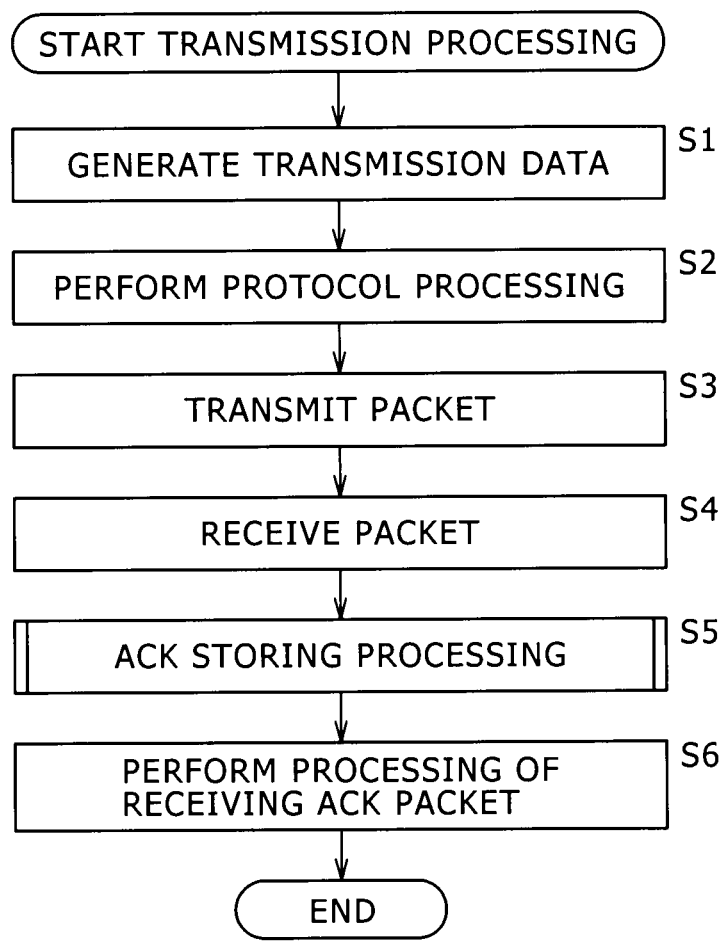
FIG. 2 is a flowchart illustrating transmission processing according to the first embodiment of the present invention.

Referring back to the flowchart of FIG. 2, in step S6, the TCP/IP processor 22 recognizes data items, among a plurality of data items, which are included in the transmission data and which have been transmitted in accordance with information items included in corresponding ACK packets so as to discard the data items which have been transmitted at an arbitrary timing in which the TCP/IP processor 22 receives the ACK packets from the ACK storing unit 24. The transmission processing is thus terminated.

By this, in the transmission apparatus 11, the TCP/IP processor 22 performs the TCP/IP transmission processing while the ACK storing unit 24 restricts a supply of an ACK packet received from the data receiver to the TCP/IP processor 22. Accordingly, an amount of processing of receiving an ACK packet performed by the TCP/IP processor 22 can be reduced. This is significantly effective in a case where a CPU (Central Processing Unit) having small capacity is used.

Here, it has been described that the ACK storing unit 24 determines whether the ACK packet is to be supplied with reference to the configuration shown in FIG. 1. However, the ACK storing unit 24 may make such a determination in accordance with a request from the TCP/IP processor 22. Next, a configuration designed for processing of receiving the stored latest ACK packet at a predetermined timing, which is performed by the transmission apparatus 11 having a section which stores the latest ACK packet, will be described.

Figure 4:
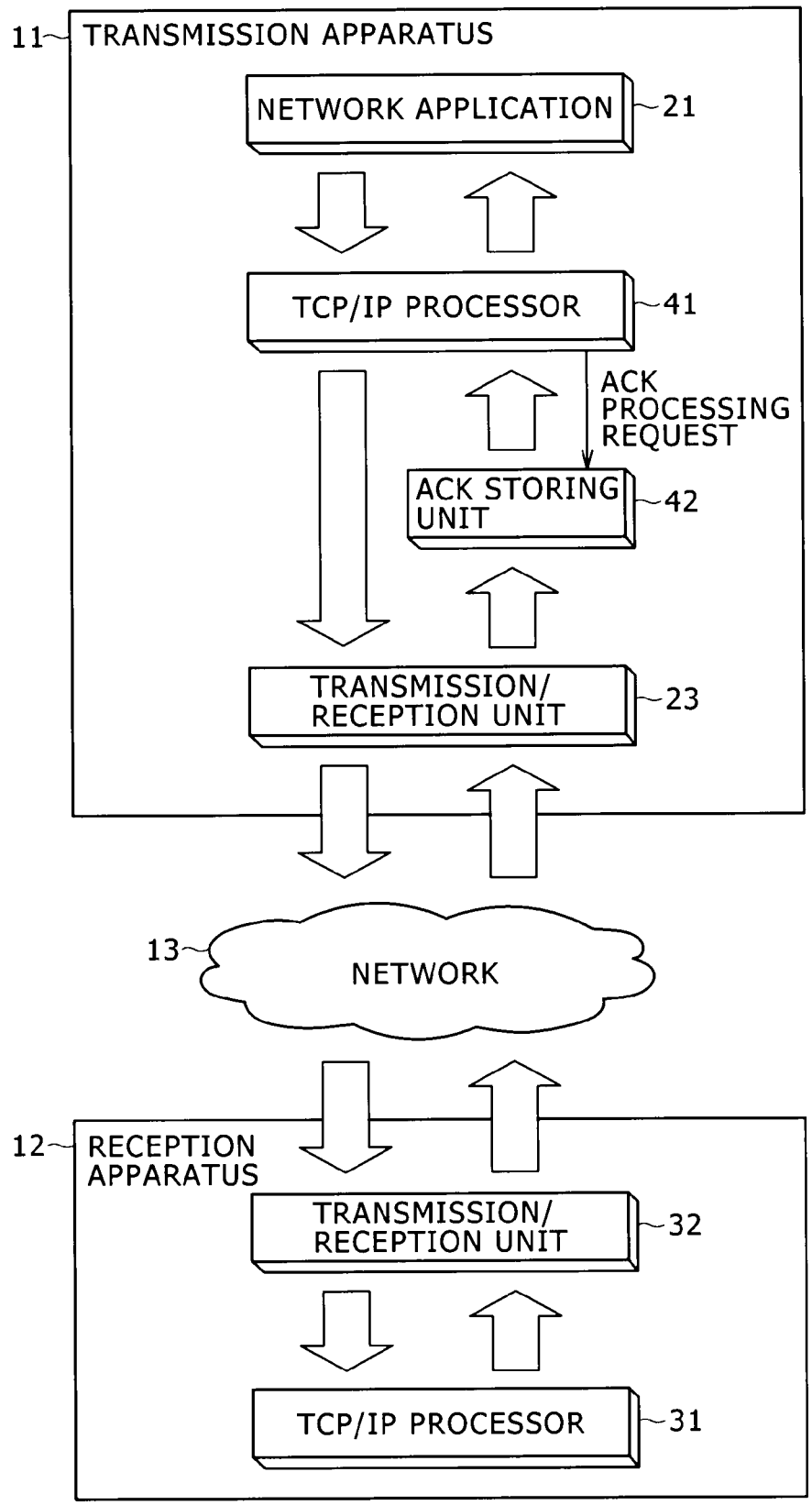
FIG. 4 is a block diagram illustrating a communication system according to a second embodiment of the present invention.

FIG. 4 is a block diagram illustrating another configuration of the communication system according to a second embodiment of the present invention.

Note that reference numerals the same as those shown in FIG. 1 are used for components shown in FIG. 4 which are the same as those shown in FIG. 1, and therefore, descriptions thereof are omitted for avoiding a repetition. This configuration is different from that of FIG. 1 in that a TCP/IP processor 41 and an ACK storing unit 42 are employed instead of the TCP/IP processor 22 and the ACK storing unit 24, respectively.

The TCP/IP processor 41 has a function basically the same as that of the TCP/IP processor 22. However, the TCP/IP processor 41 is different from the TCP/IP processor 22 in that the TCP/IP processor 41 further has a function of transmitting the ACK storing unit 42 of an ACK processing request at an arbitrary timing.

Note that, the ACK processing request is transmitted from the TCP/IP processor 41 to the ACK storing unit 42 when a latest ACK packet stored in the ACK storing unit 42 is to be received by the TCP/IP processor 41. Therefore, the TCP/IP processor 41 receives the latest ACK packet stored in the ACK storing unit 42 by transmitting the ACK processing request to the ACK storing unit 42.

Note that the ACK processing request should be less-frequently issued in order to attain high transmission performance whereas the ACK processing request should be frequently issued in order to attain high robustness. That is, the transmission performance and the robustness have the trade-off relationship, and are influenced by performance of hardware of the receiver or network throughput. Therefore, an appropriate value is set to the frequency of issuance of the ACK processing request by a designer.

The ACK storing unit 42 stores an ACK packet supplied from a transmission/reception unit 23, and supplies the latest ACK packet stored therein to the TCP/IP processor 41 in response to the ACK processing request transmitted from the TCP/IP processor 41.

Note that since the ACK packet is supplied to the TCP/IP processor 41 in response to the ACK processing request, the maximum number of stored ACK packets and an ACK storing timer are not demanded to be set in a transmission apparatus 11 of FIG. 4. However, as with the transmission apparatus 11 of FIG. 1, such parameters may be set. In this case, The ACK storing unit 42 supplies the latest ACK packet stored therein to the TCP/IP processor 41, in a case where the ACK processing request is transmitted thereto, in a case where another ACK packet which is not continuous from the ACK packet stored therein is received, in a case where a period of time in which the ACK storing timer counts after the latest ACK packet is stored exceeds a certain period of time, or in a case where the number of stored ACK packets has reached the maximum number of stored ACK packets.

Other configurations of the communication system shown in FIG. 4 are the same as those of the communication system shown in FIG. 1.

Transmission processing performed by the transmission apparatus 11 of FIG. 4 will now be described.

The transmission processing performed by the transmission apparatus 11 of FIG. 4 is different from that performed by the transmission apparatus 11 of FIG. 1 which is described with reference to the flowchart of FIG. 2 in operations performed in step S5 and step S6. Therefore, an operation performed by the ACK storing unit 42 of FIG. 4 which corresponds to the operation of step S5 of FIG. 2 and an operation performed by the TCP/IP processor 41 of FIG. 4 which corresponds to the operation of step S5 of FIG. 2 will be described hereinafter.

Specifically, as with the operations performed in step S1 to step S4 of FIG. 2, a packet transmitted from the transmission apparatus 11 of FIG. 4 is received by a reception apparatus 12, an ACK packet serving as an acknowledgement of reception is transmitted from the reception apparatus 12. The transmission apparatus 11 receives the ACK packet.

Figure 5:
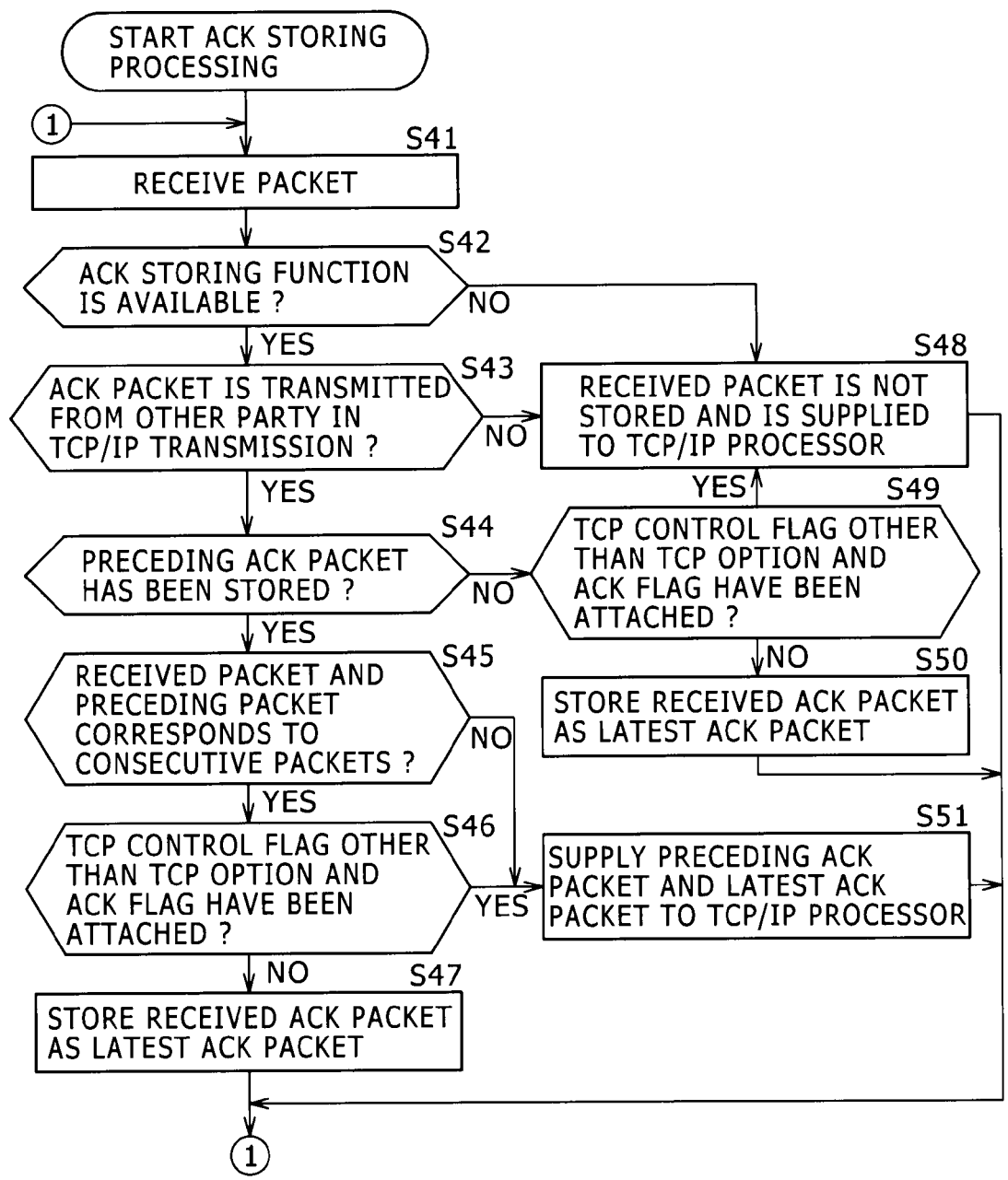
FIG. 5 is a flowchart illustrating ACK storing processing according to the second embodiment of the present invention.

Then, the ACK storing unit 42 of FIG. 4 performs ACK storing processing which is described with reference to a flowchart of FIG. 5 and which corresponds to the ACK storing processing performed in step S5 of FIG. 2. That is, the processing shown in the flowchart of FIG. 5 corresponds to the processing performed in step S5 of FIG. 2.

As with the operations performed in step S11 to step S14, step S19, and step S20, in step S41 to step S44, step S48, and step S49, in a case where an ACK storing function of the ACK storing unit 42 is not available, in a case where a received packet does not correspond to a packet transmitted from a communication partner, and in a case where the received packet corresponds to the packet transmitted from the communication partner and a TCP control flag other than a TCP option and an ACK flag has been added to the ACK packet, the received ACK packet is not stored in the ACK storing unit 42 and is immediately supplied to the TCP/IP processor 41.

On the other hand, when a preceding ACK packet has not been stored in the ACK storing unit 42 and it is determined that a TCP control flag other than a TCP option and an ACK flag has not been added to the received ACK packet in step S49, the ACK storing unit 42 stores the received packet therein as the latest ACK packet in step S50. Note that, unlike the operation of step S21 of FIG. 3, the ACK storing timer is not demanded to be set in step S50, and therefore, an operation of setting the ACK storing timer is not performed.

As with the operations in step S15, step S16, and step S22 of FIG. 3, in step S45, step S46, and step S51, when the ACK packet received by the ACK storing unit 24 is not continuous from the stored preceding ACK packet, the stored preceding ACK packet and the latest ACK packet are supplied to the TCP/IP processor 41 whereas when the ACK packet received by the ACK storing unit 24 is continuous from the stored preceding ACK packet, it is determined whether an TCP control flag other than a TCP option and an ACK flag has been added to the ACK packet in step S46. When the determination is affirmative in step S46, the ACK storing unit 42 supplies the preceding ACK packet stored therein and the latest ACK packet to the TCP/IP processor 41 in step S51.

On the other hand, when the determination is negative in step S46, the ACK storing unit 42 stores the received ACK packet as the latest ACK packet therein in step S47. Note that, unlike the operation performed in step S18 of FIG. 3, the operation of setting the ACK storing timer and an operation of counting stored ACK packets are not demanded to be performed, and accordingly, these operations are omitted.

As described above, as with the ACK storing unit 24 of FIG. 1, in the ACK storing unit 42 of FIG. 4, an operation of storing the received ACK packet is performed. However, the preceding ACK packet which has been stored therein is not demanded to be supplied, and therefore, an operation of controlling the ACK storing timer and the number of stored ACK packets is not performed.

Figure 6:
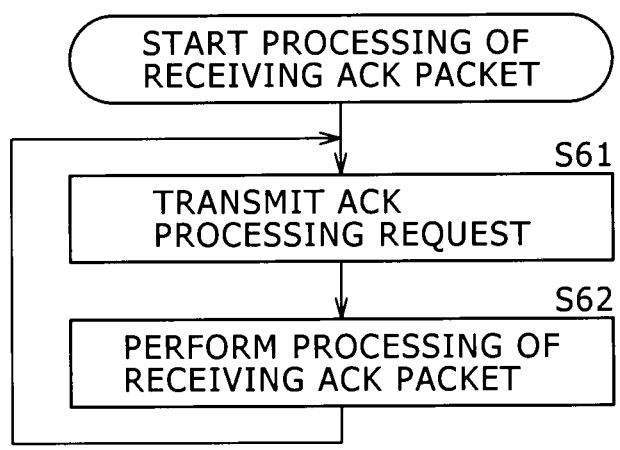
FIG. 6 is a flowchart illustrating processing of receiving an ACK packet.

Referring back to the flowchart of FIG. 2, the TCP/IP processor 41 of FIG. 4 performs processing of receiving an ACK packet in step S6. This processing will be described with reference to a flowchart shown in FIG. 6. That is, the processing of the flowchart shown in FIG. 6 corresponds to the operation performed in step S6 of FIG. 2.

In step S61, the TCP/IP processor 41 transmits an ACK processing request to the ACK storing unit 42 at an arbitrary timing, for example, at a timing when processing for a unit of single transmission performed in the TCP/IP processor 41 is completed. The ACK storing unit 42 transmits an ACK packet in response to the request, and the TCP/IP processor 41 receives the ACK packet which was stored in the ACK storing unit 42.

In step S62, the TCP/IP processor 41 performs the processing of receiving an ACK packet. Specifically, the TCP/IP processor 41 recognizes data items which have been transmitted in accordance with information items included in corresponding ACK packets transmitted from the ACK storing unit 42 so as to discard the data items which have been transmitted. Thereafter, the process returns to step S61 and operations in step S61 and step S62 are repeatedly performed.

As described above, the processing of receiving an ACK packet is performed by transmitting the ACK packet from the ACK storing unit 42 to the TCP/IP processor 41 in response to the ACK processing request supplied from the TCP/IP processor 41 which performs the processing of receiving an ACK packet.

As described above, according to the present embodiment, since a supply of an ACK packet from a data receiver to a section which performs the processing of receiving an ACK packet can be restricted. Accordingly, an amount of the processing can be reduced resulting in improvement of a speed of the TCP/IP communication. This is significantly effective in a case where a CPU having small capacity such as an incorporated CPU is used, for example.

A series of the foregoing operations may be performed by hardware or software. In a case where the series of the operations is executed by software, a program which constitutes the software is installed in a computer incorporated in dedicated hardware, or installed in a general personal computer, for example, which can execute various functions by installing various programs from a program recording medium.

FIG. 7 is a block diagram illustrating an example of a configuration of a personal computer which performs the series of the operations by executing a program. A CPU 111 executes various operations in accordance with programs stored in a ROM (Read Only Memory) 112 and a recording unit 118. A RAM (Random Access Memory) 113 stores programs and data, for example, to be executed by the CPU 111 as needed. The CPU 111, the ROM 112, and the RAM 113 are connected to one another through a bus 114.

The CPU 111 is connected through the bus 114 to an input/output interface 115. The input/output interface 115 is connected to an input unit 116 including a microphone, and an output unit 117 including a display and a speaker. The CPU 111 executes various operations in response to various instructions input using the input unit 116. The CPU outputs results of the operations to the output unit 117.

A recording unit 118 connected to the input/output interface 115 corresponds to a hard disk, for example, and stores programs to be executed by the CPU 111 and various data. A communication unit 119 communicates with external devices through a network such as the Internet or a local area network.

A program may be received through the communication unit 119 and recorded in the recording unit 118.

A drive 120 connected to the input/output interface 115 drives a removable medium 121 such as a magnetic disc, an optical disc, a magneto-optical disc, or a semiconductor memory which is inserted therein, and obtains programs and data recorded in the removable medium 121. The obtained programs and data are transmitted to the recording unit 118 as needed and stored in the recording unit 118.

Examples of the program recording medium which stores the programs which is installed in a computer and which can be executed by the computer include the removable medium 121 which is a package medium such as a magnetic disk (including a flexible disk), an optical disc (including a CD-ROM (Compact Disc-Read Only Memory)), a DVD (Digital Versatile Disc), a magneto-optical disc, or a semiconductor memory, and the ROM 112 which temporarily or permanently stores the program, or a hard disk including the recording unit 118. The program is stored in the program recording medium through the communication unit 119 corresponding to an interface such as a rooter or a modem as needed and further through a wired or wireless communication medium such as a local area network, the Internet, or digital satellite broadcasting.

Note that, a step of recording a program stored in the recording medium includes processing performed in a time-series manner in an order described herein, and the step further includes processing performed in parallel or processing independently performed.

The term "system" means an entire apparatus including a plurality of units herein.

The present embodiment is not limited to the foregoing embodiments, and various modification may be made without departing from the scope of the invention.

The present application contains subject matter related to that disclosed in Japanese priority Patent Application JP 2008-098267 filed in the Japan Patent Office on Apr. 4, 2008, the entire content of which is hereby incorporated by reference.

It should be understood by those skilled in the art that a variety of modifications, combinations, sub-combinations and alterations may occur, depending on design requirements and other factors insofar as they are within the scope of the appended claims or the equivalents thereof.

What is claimed is:

1. A transmission apparatus comprising:
receiving means for receiving ACK packets transmitted from a reception apparatus in response to transmission data items;
ACK (Acknowledgement) storing means for storing a latest ACK packet which is last received among the ACK packets for a predetermined period of time; and
TCP/IP (Transmission Control Protocol/Internet Protocol) processing means for performing processing of receiving an ACK packet in accordance with the latest ACK packet supplied from the ACK storing means at the expiration of the predetermined period of time, wherein
the latest ACK packet which is last received from among the received ACK packets is transferred to the TCP/IP processing means without storing the latest ACK packet in the ACK storing means upon determination that a function for storing the received ACK packets is disabled,
wherein, in a case where the ACK storing means receives an ACK packet that is not consecutive to the packet which has been stored as the latest ACK packet in the ACK storing means, the ACK storing means supplies the latest ACK packet to the TCP/IP processing means when a period of time for which the latest ACK packet is stored in the ACK storing means exceeds a predetermined period of time or when the number of the stored ACK packets reaches the maximum number of ACK packets to be stored.

2. The transmission apparatus according to claim 1,
wherein the ACK storing means stores a particular ACK packet, among the received ACK packets, as the latest ACK packet in a case where the particular ACK packet has been transmitted from a communication partner in a TCP/IP communication and in a case where a preceding packet has not been stored in the ACK storing means.

3. The transmission apparatus according to claim 1,
wherein the ACK storing means stores a particular ACK packet, among the received ACK packets, as the latest ACK packet, under the condition that the particular ACK packet has been transmitted from the communication partner in the TCP/IP communication and is consecutive to another ACK packet which has been stored as the latest packet in the ACK storing means, when a period of time for which the another latest ACK packet is stored in the ACK storing means does not exceed a predetermined period of time and when the number of the stored ACK packets is smaller than the maximum number of ACK packets to be stored.

4. The transmission apparatus according to claim 1,
wherein the TCP/IP processing means transmits to the ACK storing means an ACK processing request for obtaining the latest ACK packet at a predetermined timing, and
the ACK storing means supplies the stored latest ACK packet to the TCP/IP processing means in response to the ACK processing request.

5. A transmission method comprising the steps of:
storing, by an ACK storing unit, a latest ACK packet which is last received among ACK packets transmitted from a reception apparatus in response to transmission data items for a predetermined period of time; and
performing, by a TCP/IP (Transmission Control Protocol/Internet Protocol) unit, processing of receiving an ACK packet in accordance with the latest ACK packet supplied at the expiration of the predetermined period, wherein,
the latest ACK packet which is last received from among the received ACK packets is transferred to the TCP/IP processing unit without storing the latest ACK packet in the ACK storing unit upon determination that a function for storing the received ACK packets is disabled, and
in a case where the ACK storing unit receives an ACK packet that is not consecutive to the packet which has been stored as the latest ACK packet in the ACK storing unit, the ACK storing unit supplies the latest ACK packet to the TCP/IP processing unit when a period of time for which the latest ACK packet is stored in the ACK storing unit exceeds a predetermined period of time or when the number of the stored ACK packets reaches the maximum number of ACK packets to be stored.

6. A non-transitory computer readable storage medium having instructions stored therein, which when executed by a processor in a transmission apparatus causes the processor to execute a method comprising steps of:
storing, by an ACK storing unit, a latest ACK packet which is last received among ACK packets transmitted from a reception apparatus in response to transmission data items for a predetermined period of time; and
performing, by a TCI/IP (Transmission Control Protocol/Internet Protocol) unit processing of receiving an ACK packet in accordance with the latest ACK packet supplied at the expiration of the predetermined period of time, wherein
the latest ACK packet which is last received from among the received ACK packets is transferred to the TCP/IP processing unit without storing the latest ACK packet in the ACK storing unit upon determination that a function for storing the received ACK packets is disabled,
wherein, in a case where the ACK storing unit receives an ACK packet that is not consecutive to the packet which has been stored as the latest ACK packet in the ACK storing unit, the ACK storing unit supplies the latest ACK packet to the TCP/IP processing unit when a period of time for which the latest ACK packet is stored in the ACK storing unit exceeds a predetermined period of time or when the number of the stored ACK packets reaches the maximum number of ACK packets to be stored.

7. A transmission apparatus comprising:

a receiving unit configured to receive ACK packets transmitted from a reception apparatus in response to transmission data items;

an ACK storing unit configured to store a latest ACK packet which is last received among the ACK packets for a predetermined period of time; and a TCP/IP processing unit configured to perform process of receiving an ACK packet in accordance with the latest ACK packet supplied from the ACK storing means at the expiration of the predetermined period of time, wherein, the latest ACK packet which is last received from among the received ACK packets is transferred to the TCP/IP processing unit without storing the latest ACK packet in the ACK storing unit upon determination that a function for storing the received ACK packets is disabled, and in a case where the ACK storing unit receives an ACK packet that is not consecutive to the packet which has been stored as the latest ACK packet in the ACK storing unit, the ACK storing unit supplies the latest ACK packet to the TCP/IP processing unit when a period of time for which the latest ACK packet is stored in the ACK storing unit exceeds a predetermined period of time or when the number of the stored ACK packets reaches the maximum number of ACK packets to be stored.

* * * * *